Aug. 17, 1937.  G. LEWINSKI  2,090,536
VELOCIPEDE STRUCTURE
Filed June 1, 1936

INVENTOR
GEORGE LEWINSKI
BY
ATTORNEYS

Patented Aug. 17, 1937

2,090,536

UNITED STATES PATENT OFFICE 2,090,536

VELOCIPEDE STRUCTURE

George Lewinski, Toledo, Ohio, assignor to The American-National Company, Toledo, Ohio, a corporation of Ohio Application June 1, 1936, Serial No. 82,967

9 Claims. (Cl. 208—113)

This invention relates generally to velocipedes and refers more particularly to those in which the backbone or frame structure thereof is formed of tubular members.

One of the essential objects of the invention is to provide a backbone of this type having a strengthening and bracing portion that cooperates with the rear axle of the velocipede to provide a pair of laterally spaced steps between the rear wheels of the velocipede.

Another object is to provide a strong and durable velocipede backbone structure that comprises relatively few parts and is comparatively inexpensive to manufacture.

Other objects, advantages and novel details of construction of this invention will be made more apparent as this description proceeds, especially when considered in connection with the accompanying drawing, wherein.

Figure 1:
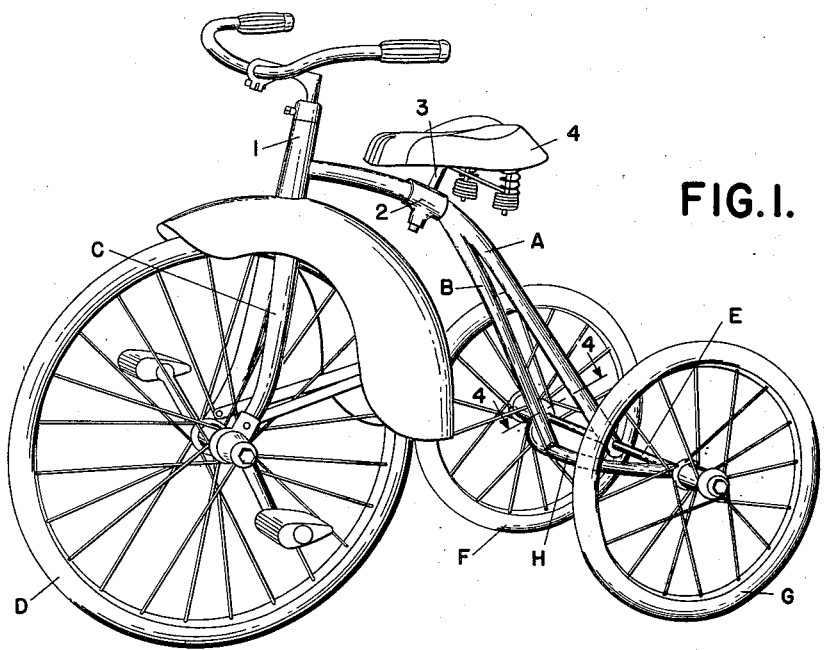
Figure 1 is a perspective view of a velocipede embodying my invention.
Figure 2:
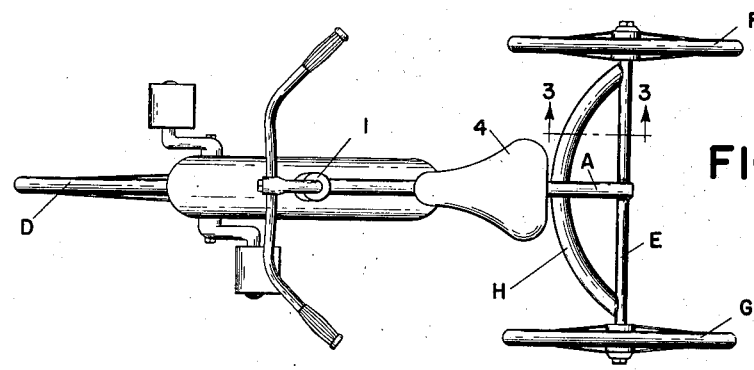
Figure 2 is a top plan view thereof.
Figure 3:
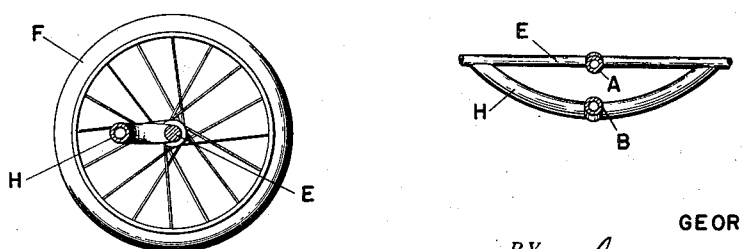
Figure 3 is a sectional view taken substantially on the line 3—3 of Figure 2.
Figure 4:
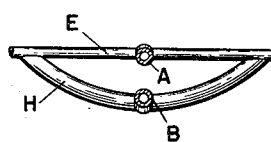
Figure 4 is a sectional view taken substantially on the line 4—4 of Figure 1.

Referring now to the drawing, A is the main portion and B is the strengthening or bracing portion of a velocipede backbone embodying my invention.

As shown, the main portion A is provided at its forward end with an upright tubular part 1 that receives the upwardly extending shank of a suitable steering fork C for the front wheel D, and extends rearwardly and downwardly and is connected at its lower rear end to the rear axle E for the rear wheels F and G, respectively. The main portion A is also provided adjacent the upright tubular part 1 with a fitting 2 that receives the post 3 of a suitable saddle or seat 4.

The bracing portion B of the backbone projects downwardly and rearwardly from the underside of the main portion A just in rear of the fitting 2 and is provided at its lower end in advance of the axle E with a rearwardly opening curved portion H that is terminally connected to the axle E adjacent the rear wheels F and G. Preferably the portions A, B and H, respectively, of the backbone are formed of tubular members and are welded to each other. The rear ends of the curved portion H and the lower end of the main portion A are also welded to the axle E.

As shown, the connection between the main portion A and the axle E and the connection between the portion B and the portion H are coincident with the longitudinal median line of the velocipede. Moreover, the curved portion H and the axle E are substantially in a common horizontal plane, hence parts of the curved portion H upon opposite sides of the portion B and parts of the axle E upon opposite sides of the main portion A cooperate with each other to form laterally spaced steps between the rear wheels F and G.

Thus, from the foregoing, it will be apparent that the portions A and B of the backbone cooperate in effect to form an inverted Y-shaped frame structure and that the connections of these portions A and B with the axle E and horizontal portion H insure rigidity and strength. The curved horizontal portion H further cooperates with the axle E to not only form the laterally spaced steps mentioned, but also to insure rigidity and strength. Hence, the velocipede structure is extremely strong and durable even though it comprises only a few parts, and can be manufactured at a comparatively low cost, since the elements referred to, with the exception of the axle, are formed of tubular members which can be easily shaped and assembled together.

What I claim as my invention is:

1. A velocipede having a rear axle and a backbone rigid with the axle, the backbone including an upright inverted substantially Y-shaped structure, and a horizontal member connected to said axle, the furcations of the Y being connected to the axle and horizontal member respectively.

2. A velocipede having a rear axle, a longitudinally extending backbone connected to the axle substantially midway of its ends, and a substantially horizontal transversely extending rearwardly opening curved member terminally connected to the axle at opposite ends thereof and cooperating with the axle to form steps upon opposite sides of the backbone.

3. A velocipede having a rear axle and a frame structure including a backbone connected to the axle, and an inverted substantially T-shaped brace having the stem of the T connected to the backbone and having opposite ends of the base of the T connected to the axle, the base of the T and the axle being substantially in a common horizontal plane and cooperating with each other to form a step.

4. A velocipede having an axle, a curved member terminally connected to the axle at opposite ends thereof, said member and axle being in a common horizontal plane and cooperating with each other to form a segmental step, and an inverted substantially Y-shaped frame structure having the furcations of the Y connected to the axle and curved member respectively at approximately the center thereof.

5. In a velocipede, a longitudinally extending inverted substantially Y-shaped backbone, a transversely extending axle carried by one furcation of the Y, and a transversely extending brace carried by the other furcation of the Y and cooperating with the axle to form a step.

6. In a velocipede, a backbone having an inverted V-shaped portion, a transversely extending axle carried by one arm of the V, and a transversely extending bracing member carried by the other arm of the V and terminally connected to the axle upon opposite sides of the first mentioned arm of the V.

7. In a velocipede, a transversely extending axle, a transversely extending member in advance of and terminally connected to said axle, and a backbone having leg portions secured to said axle and curved member respectively.

8. In a velocipede, a transversely extending axle, an arched member terminally connected to and cooperating with the axle to form a step, and a backbone having diverging portions secured to said member and axle respectively.

9. In a velocipede, a transversely extending axle, a transversely extending brace cooperating with the axle to form a step, and a longitudinally extending backbone having spaced portions secured to said axle and brace respectively.

GEORGE LEWINSKI.